United States Patent [19]
Whitaker

[11] Patent Number: 5,299,886
[45] Date of Patent: Apr. 5, 1994

[54] SPILL CONTAINMENT SYSTEM

[75] Inventor: Jack L. Whitaker, Cincinnati, Ohio

[73] Assignee: Chem Serv Environmental, Columbus, Ohio

[21] Appl. No.: 29,005

[22] Filed: Mar. 10, 1993

[51] Int. Cl.$^5$ .............................................. E02B 15/06
[52] U.S. Cl. ......................................... 405/66; 405/63
[58] Field of Search ..................... 405/63, 64, 66, 68, 405/72, 87, 103, 107, 115

[56] References Cited

U.S. PATENT DOCUMENTS

| | | |
|---|---|---|
| 3,321,923 | 5/1967 | Smith et al. ............................. 405/66 |
| 3,762,168 | 10/1973 | Pardee ................................... 405/65 |
| 3,916,628 | 11/1975 | Halpern et al. ...................... 405/103 |
| 4,076,624 | 2/1978 | Tolan .................................. 405/66 X |
| 4,089,178 | 5/1978 | Kinase et al. .......................... 405/66 |
| 4,248,547 | 2/1981 | Brown .................................... 405/72 |
| 4,484,836 | 11/1984 | Bailard ............................ 405/103 X |
| 4,738,563 | 4/1988 | Clark ..................................... 405/52 |

*Primary Examiner*—David H. Corbin
*Attorney, Agent, or Firm*—Jon L. Roberts

[57] ABSTRACT

A deployable spill containment boom which, when not in use, is stored along a shoreline. Attached to one end of the deployable boom is a floatation device. The boom is deployed into a moving waterway by means of a cable to which the boom is attached. The deployment cable runs through a pulley attached to an anchor permanently located on the bottom of the river. The other end of the deployment cable is attached to a winch system located on shore on a "take-up" reel. During an oil spill, the system is actuated by a radio signal. The take up reel reels in one end of the deployment cable and a "supply reel" pays out the cable through the anchored pully cable. The deployable boom is then pulled away from the shoreline. Since the boom floats it remains on the surface of the water while the cable is deployed The deployment cable winding operation causes the boom to be extended out into the river. The end of the boom with the floatation device extends into the river to the location above the anchor. In this fashion a floating boom is extended into the flow of the river. The angle of deployment with respect to the river current causes all oil to be channeled toward the shore where a pump system can pump the pollutants from the water into holding tanks. A boom tension device is utilized to the boom in contact with the water at the shoreline.

21 Claims, 7 Drawing Sheets

SPILL CONTAINMENT SYSTEM

FIELD OF THE INVENTION

The present invention relates generally to an apparatus for containment of petrochemcial spills in rivers. More particularly the invention concerns a novel apparatus comprising a deployable boom attached to an anchor on the bottom of a river, the apparatus being very quickly deployable in the event of an oil or other chemical spill to contain that spill.

DISCUSSION OF BACKGROUND ART

As the United States has become progressively more environmentally conscious many areas of environmental pollution have been regulated. Areas of great and recent concern for regulation and pollution abatement are the rivers and streams in America. In times past rivers and streams were convenient dumping points for pollution from all manner of industrial operations. However the flow of a river by its nature carries the pollution further downstream to many areas that are adversely affected by the upstream pollution.

In many rivers in America oil and other chemical terminals are located on rivers where potential pollutants are loaded and unloaded to industrial, municipal, and other users. Spills from these loading and unloading points pose grave environmental hazards to those downstream of any such spill.

Existing systems for oil spill control are cumbersome and take many hours if not days to deploy or are extremely expensive to construct. These systems typically use floating booms to contain the spill. The current in a river will frequently take the pollutants down stream many many miles before any such booms can be deployed to intercept a spill. In the meantime, the river banks become polluted with the spilled substance between the point of the spill and the final point where floating booms or other means can hopefully contain the spill. All the intervening territory including the towns and people who live therein are adversely affected by any such accident.

Various inventions have come into existence which attempt to prevent pollutants or other undesirable objects from reaching areas where they are not wanted. For example, U.S. Pat. No. 4,738,563 to Clark describes a buoyant marine fence. This device while semi-buoyant is not a pollution control device but rather uses netting to prevent sea animals and debris from reaching swimming areas.

U.S. Pat. No. No. 3,321,923 to Smith et al. describes a steerable self-powered floating structure designed to be used as a water pollution control, rescue, and life saving device. This system relies upon a source of pressurized air to inflate a boom and to steer it to different locations. Such a system suffers when it is used perpendicular to the flow of wave motion or the current in a river. In fact the specification itself states that the invention is best used in the direction of any such current. Thus when used in a river scenario air pressure alone might not be sufficient to steer this self powered structure into place and hold it there for an extended period of time except in very limited circumstances.

U.S. Pat. No. No. 4,248,547 discloses a fence for enclosing impurities floating on water. This invention comprises a fence wherein pickets are inserted which have a density lighter than water and which cause the fence to float in a vertical position. While this invention does provide a barrier against impurities floating on the surface of the water its deployment is cumbersome and not readily amenable to automated means. Further no provision is made for securing this particular fence against the flow of a river which would cause a tremendous pressure to be exerted on the fence itself.

U.S. Pat. No. No. 3,762,168 describes a water pollution control device for removing pollutants from navigable streams, rivers and lakes. This device requires the installation of a series of barriers to both skim the surface of the stream and to simultaneously direct any impurities or debris to another location In the stream where a second barrier is created. This invention requires not only the installation of a large skimming barrier but the creation of an island to anchor one end of the first barrier and to anchor the second barrier wherein debris removal can take place. Further, this device poses a barrier to navigation and must be removed in order to permit boats to pass. Thus it cannot be deployed rapidly at locations other than that at which it is initially constructed.

Other floating boom systems known in the art are deployed by floating vessels of one type or another and require hours if not days to put in place in order to contain a spill, something that is unacceptable in a rapidly moving river.

SUMMARY OF THE INVENTION

Accordingly, it is an objective of the present invention to contain oil and chemical spills in rivers.

It is a further objective of the present invention to be both deployable and retractable in minutes rather than pose any form of permanent or semi-permanent barrier to navigation on a river.

It is a further objective of the present invention to be fully anchored to the river bottom thereby stabilizing the boom without causing any navigational hazards.

It is yet another objective of the present invention to use the existing currents flowing in a river and along the bank to the maximum efficiency to contain a spill.

It is a further objective of the present invention to be a fully powered system that can be used in all weather and current conditions.

It is a further objective of the present invention to be used in any river regardless of the strength of the current.

It is an additional objective of the present invention to provide a spill containment system which may be rapidly redeployed in the event of damage to the boom.

The apparatus of the present invention comprises a deployable spill containment boom which, when not in use, is stored along a shoreline. The boom itself floats on the surface of the water. Attached to one end of the deployable boom is a floatation device so that the end of the boom extending into the river has additional buoyancy. The boom is deployed into the river or other moving waterway by means of a stainless steel cable (a deployment cable) to which the floatation end of the boom is attached via a shackle. The deployment cable in turn runs through a pulley which is attached to an anchor permanently located on the bottom of the river. The other end of the deployment cable is attached to a winch system located on shore on a "take-up" reel. When the boom is not deployed the steel cable lies on the floor of the river thereby posing no hazard to navigation.

In operation, during times of oil or other pollutant spill, for example, the system is actuated by a radio signal. A take up reel reels in one end of the deployment cable.

The deployment cable which extends through the pulley anchored to the bottom of the river originates on a "supply reel" of such deployment cable which pays out as the take up reel pulls the other end of the cable. The floatation end of the deployable boom, which is attached to the deployment cable via the shackle is then pulled away from the shoreline. Since the boom floats it remains on the surface of the water while the deployment cable is being pulled onto the take-up reel. In effect the system acts in a "clothesline" fashion where the deployment cable winding operation causes the boom to be extended out into the river. An additional advantage of the present invention and the "clothesline" configuration is that should the boom break away from the cable or be damaged, a new boom can be immediately affixed to the cable wound up on the take-up reel and the cable be deployed in the opposite direction thereby rapidly deploying a now boom into the river.

The end of the boom with the additional floatation device extends into the river to the location above the fixed anchor on the river bottom. Thus the floating end of the boom is not pulled under the surface of the water. In this fashion a floating boom is extended into the flow of the river. The angle of deployment of the system with respect to the river current causes all oil or other pollutants to be channeled toward the shore where a pump system can pump the pollutants from the water into holding tanks.

A boom tension device, which also acts as a deployment ramp for the boom, is utilized to insure that tension is maintained on the boom to keep it in contact with the water at the shoreline. The boom tension device is affixed to and runs down the river bank, perpendicular to the river current, at the shoreline where the boom is to be deployed. It extends into and below the water level. The boom is fed down the ramp into the water at deployment after passing beneath an idler roller. The idler roller is kept at the water level and puts tension on the boom at the shoreline to ensure that the boom doesn't rise out of the water.

DETAILED DESCRIPTION OF THE PREFERRED EMBODIMENT

Figure 1:
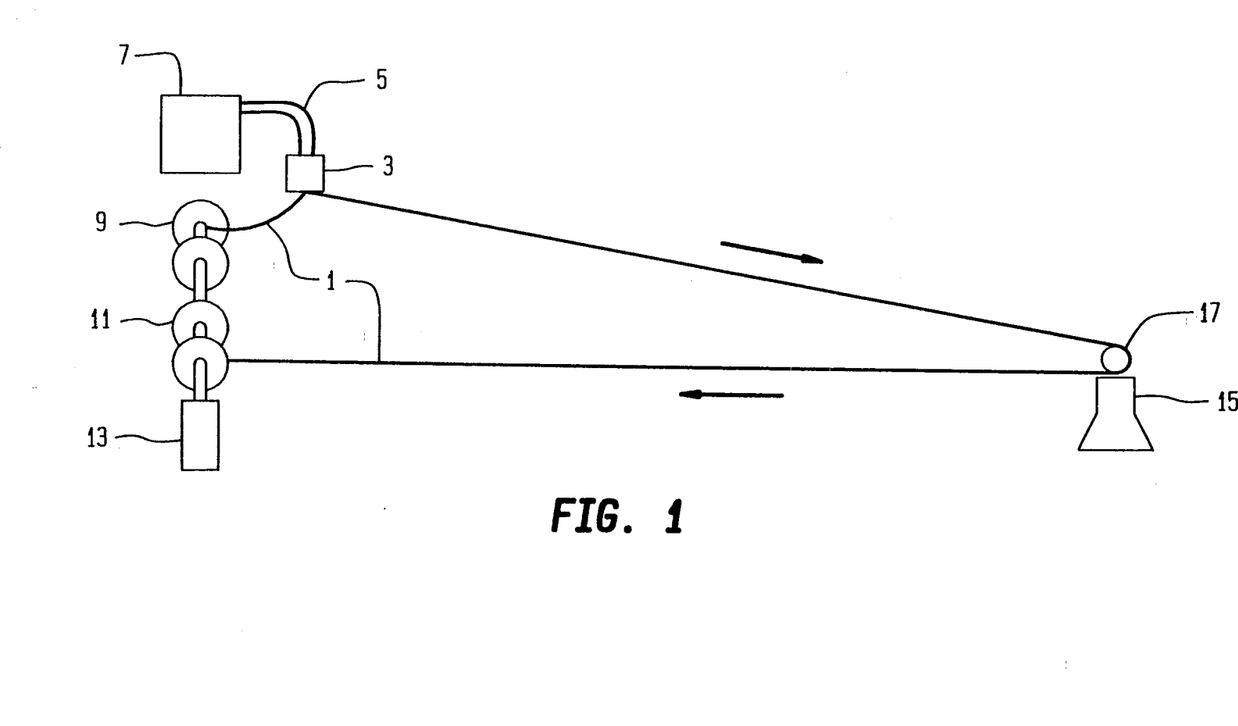
FIG. 1 shows the containment system undeployed.

Referring to FIG. 1 the generalized diagram of the spill containment system is shown. A stainless steel deployment cable 1 or "rope" emanates from a supply reel 9. The deployment cable 1 extends under the water and around a subsurface pulley 17 or other guide means which is attached to a permanent anchor 15 permanently imbedded in the river bottom. Deployment cable 1 continues back to the shore where it is attached to a take up reel 11. The deployment cable, when not in use, lies on the river bed thereby posing no obstacle to navigation. Both supply reel 9 and take up reel 11 are driven by a heavy duty motor 13.

On shore in close proximity to the supply and take up reels is the boom system. The boom system comprises a floating boom 5 to which is attached an additional floatation device 3. The floatation device 3 is constructed from a buoyant material and is attached to the end of the floating boom to prevent the floating boom from being submerged in the river by the action of the cable pulling the boom toward the fixed anchor 15. The boom is stored in a storage device or cabinet 7.

The floatation device 3 has a metal alloy rod running through or otherwise fixed to it and protruding from the end of the floatation device 3. This rod allows the floatation device to be attached to the cable 1 via a shackle 2.

Figure 2:
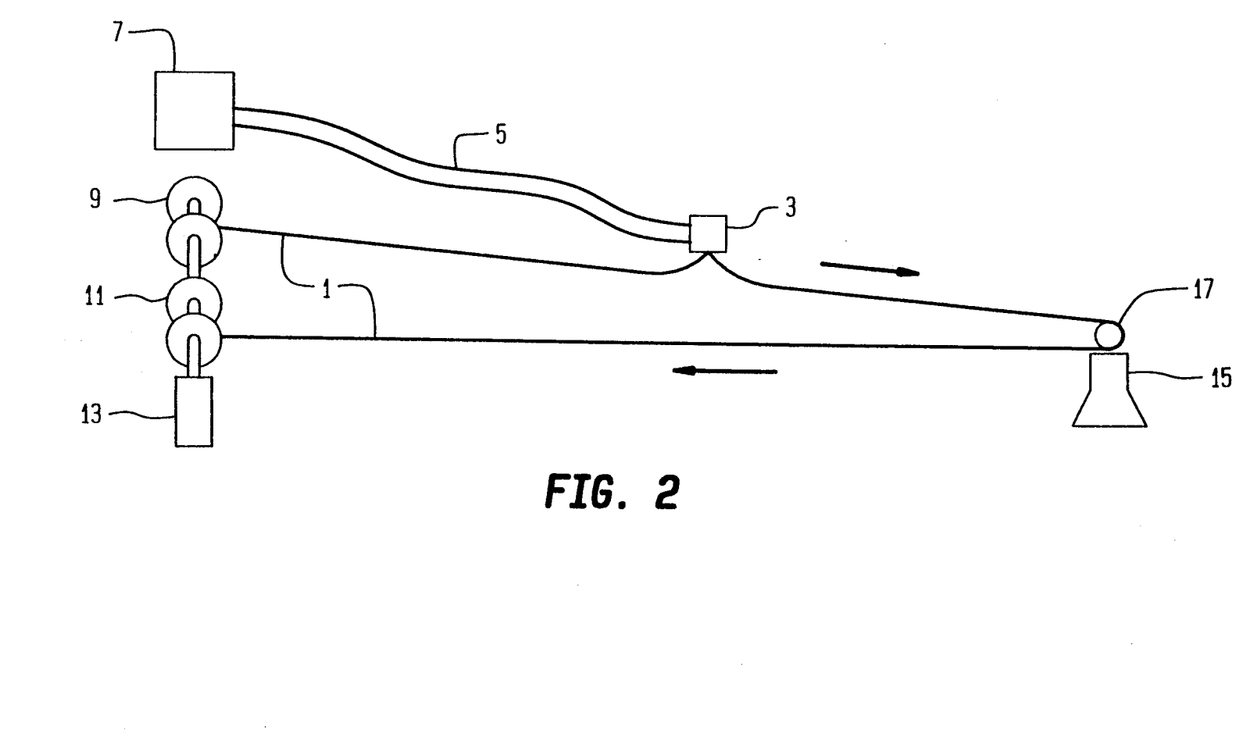
FIG. 2 shows the containment system in the process of being deployed.

Referring to FIG. 2 the spill containment system is shown in the partially deployed position. In this figure the floatation device 3 has been partially pulled out into the river. The floating boom 5 attached to the floatation device 3 is pulled along with the floatation device 3 into the river by the action of the deployment cable 1 and the supply reel 9 and take up reel 11.

Figure 3:
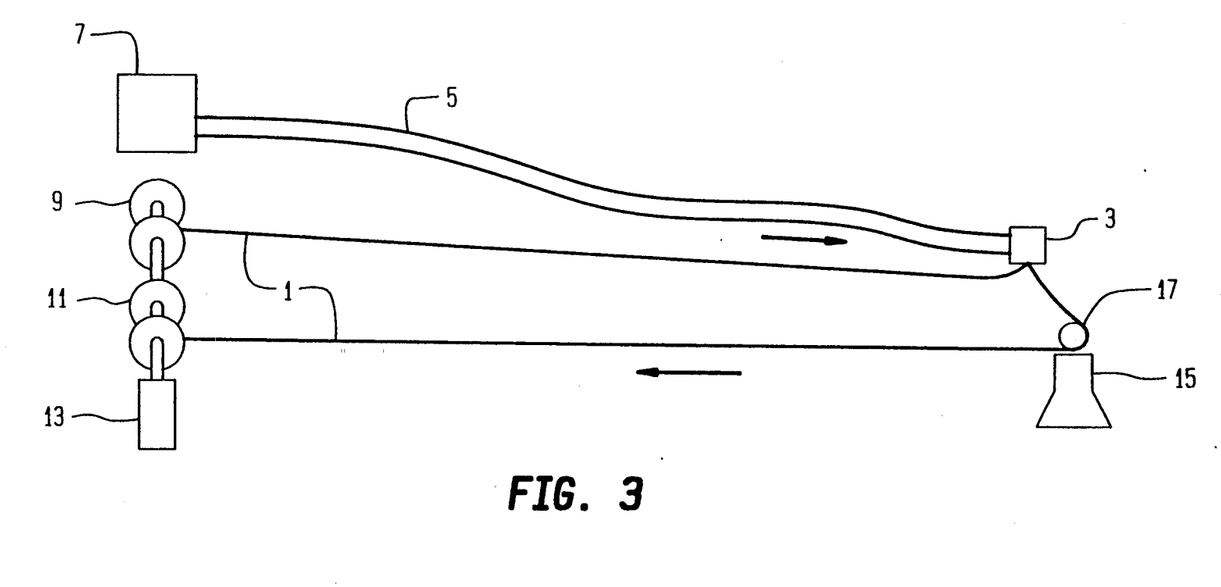
FIG. 3 shows the containment system fully deployed.

Referring to FIG. 3 the spill containment system is shown fully deployed. In this figure the floatation device 3 which is attached to the floating boom 5 has been pulled by the action of the deployment cable 1 to the location above the subsurface anchor 15. It should be noted that the boom 5 is never pulled down to the location of the subsurface anchor 15 since this would submerge the boom 5. The boom 5 is pulled over to approximately above the location of the sub surface anchor 15 such that the floatation device 3 and the boom 5 remains on the surface of the river.

The spill containment system in the preferred embodiment comprises two independently driven winches which wind and unwind a single deployment cable (take up reel 11 and supply reel 9). During boom deployment the supply reel provides a slight braking force while the take up reel winds up the steel rope. In this fashion tension is always applied to the cable during deployment. The cable 1 is typically a one inch wire rope made of type 304 stainless steel.

In the preferred embodiment the winches are driven by hydraulic drive motors with planetary reducers to provide the appropriate speed and power necessary to deploy and take up the stainless steel rope. The motor and drives are weather proof and submersible in the event of river flooding and can be driven in either direction. The drive motors of the preferred embodiment can deploy the present invention at the rate of 150 feet per minute. Typically the total amount of deployed boom is approximately 1000 feet although there is no limit to the amount of length deployable, which depends only upon the strength of the motors and amount of cable provided. A winch system by manufactured by Thern, Inc., of Winona, Minnesota is an example of a winch which may be utilized in the preferred embodiment.

The motors used in the preferred embodiment are powered by a 460 volt three phase 60 Hz system developing approximately 100 horsepower.

The anchor system preferably comprises a concrete anchor 15, or alternatively any other type of anchor, embedded in the river bottom. Such anchors are available, for example, from the Foresight Products, Inc. in Commerce City, Colorado under the trade name Manta Ray ™. This anchor system is rated at 40,000 pounds although dual 20,000 pound anchors can also be used depending upon the application. A pulley 17 or other guide means is mounted on the anchor 15 or on a bridle spanning dual anchors.

The spill containment boom 5 of the preferred embodiment is a Sea Boom Model 1018 manufactured by National Sorbents, Inc. ("NSI") or equivalent. This boom comprises a plurality of ten (10) inch floatation sections forming a floating spine 4, with an eighteen (18) inch skirt 6 which hangs below the floatation portion of the boom. The floating spine defines the confinement area, while the skirt, made from flexible sheet material, traps the spilled material. The NSI 1018 Sea Boom is a combination sorbent and containment boom. The sorbent floatation core is replaceable and folds in eight (8) foot sections for ease of storage and deployment. The double function of the boom allows both containment and removal of surface hydrocarbon pollutants and contaminants. Other booms are well known to those skilled in the art and are also contemplated for use with the present invention.

Figure 4:
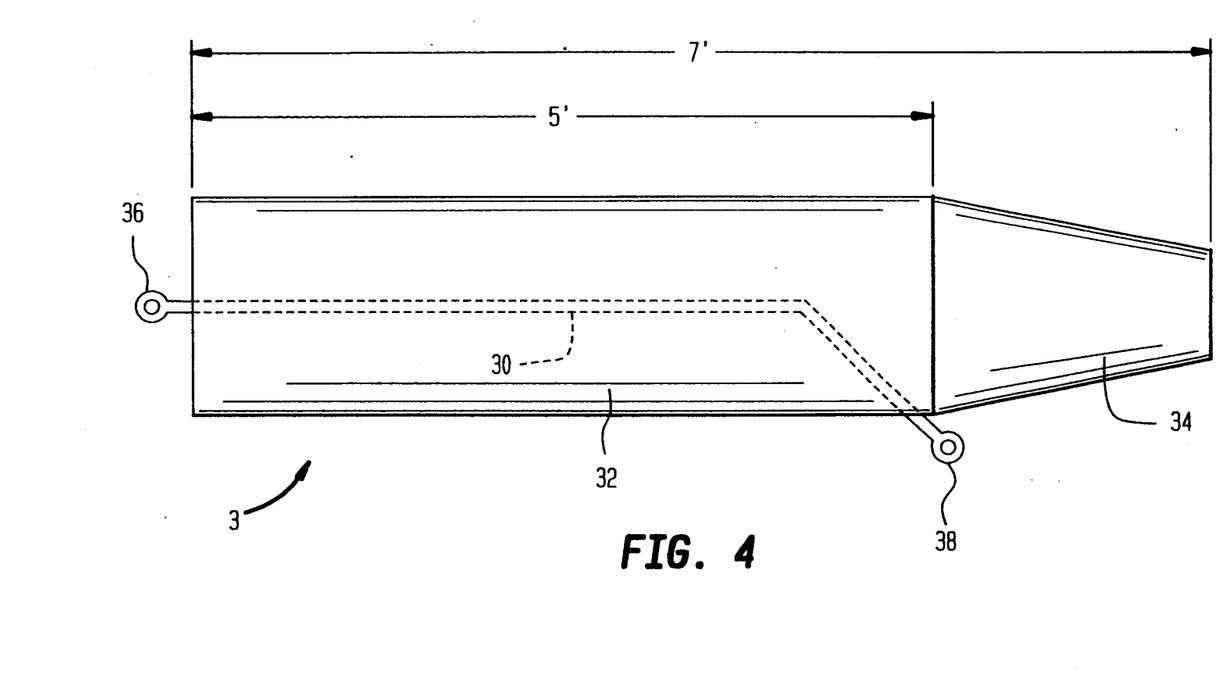
FIG. 4 shows the floatation device.

Referring to FIG. 4 the floatation device 3 is discussed. The floatation device 3 attached to the end of the containment boom in the preferred embodiment is essentially a buoy system. One such buoy system is manufactured by P.C.F., Inc. of Amelia, Ohio. This design, as shown in FIG. 4, comprises a floatation device through which runs a one inch diameter 8620 alloy steel rod 30. This floatation device has a cylindrical main body 32 that is approximately 5 feet in length and 1½ feet in diameter, and a 2 foot tapered nose 34. As shown in the figure, the steel rod 30 runs down the longitudinal center line of the main body 32, then bends at an angle to protrude from the side of the floatation device near the start of the nose portion 34. Attached to each end of the rod is a type 316 stainless steel eye nut. The first eye nut 36, protruding from the main body, is attached to the boom. The second eye nut 38, protruding from the side near the nose, is connected to the cable 1 by the shackle or other attachment means.

This particular floatation device is a fiberglass reinforced polyester buoy that is foam filled to give it buoyancy and is manufactured using a resin that will enable it to withstand seawater. In the preferred embodiment the floatation device 3 has a 1,000 pound positive buoyancy with a type 304 stainless steel rope leader attached to the floatation device 3. A stainless steel shackle is then attached to the rope leader which shackle is in turn attached to the one inch stainless steel rope.

The actuation means 14 for starting the hydraulic drive motors is shown in the drawings in schematic form. The entire invention is preferably actuated by radio control such that in the event of a spill a radio signal can be sent to the drive motors and the boom 5 can be automatically deployed into the river in a matter of minutes. The invention may also be actuated manually via a switch means such as that type of control system provided by Cattron, Sharpsville, Pennsylvania or any type of mechanical contact switch.

Further, numerous such spill containment systems can be deployed down river from a first system to trap any pollutants which escape the containment system nearest the spill. Each such system will have a different radio control such that deployment of one system does not result in deployment of all systems.

Since the invention is designed to work in conjunction with the current of the river it has been found that deploying the anchor 15 in the river upstream from the location of boom storage provides the most effective configuration for the invention. The anchor 15 is placed in the river bottom such that when deployed the boom 5 forms an angle of between 20 and 25 degrees to the current of the river. In this fashion the river current serves to entrap any of the pollutants at an apex formed between the deployed boom 5 and the shore of the river.

Figure 5:
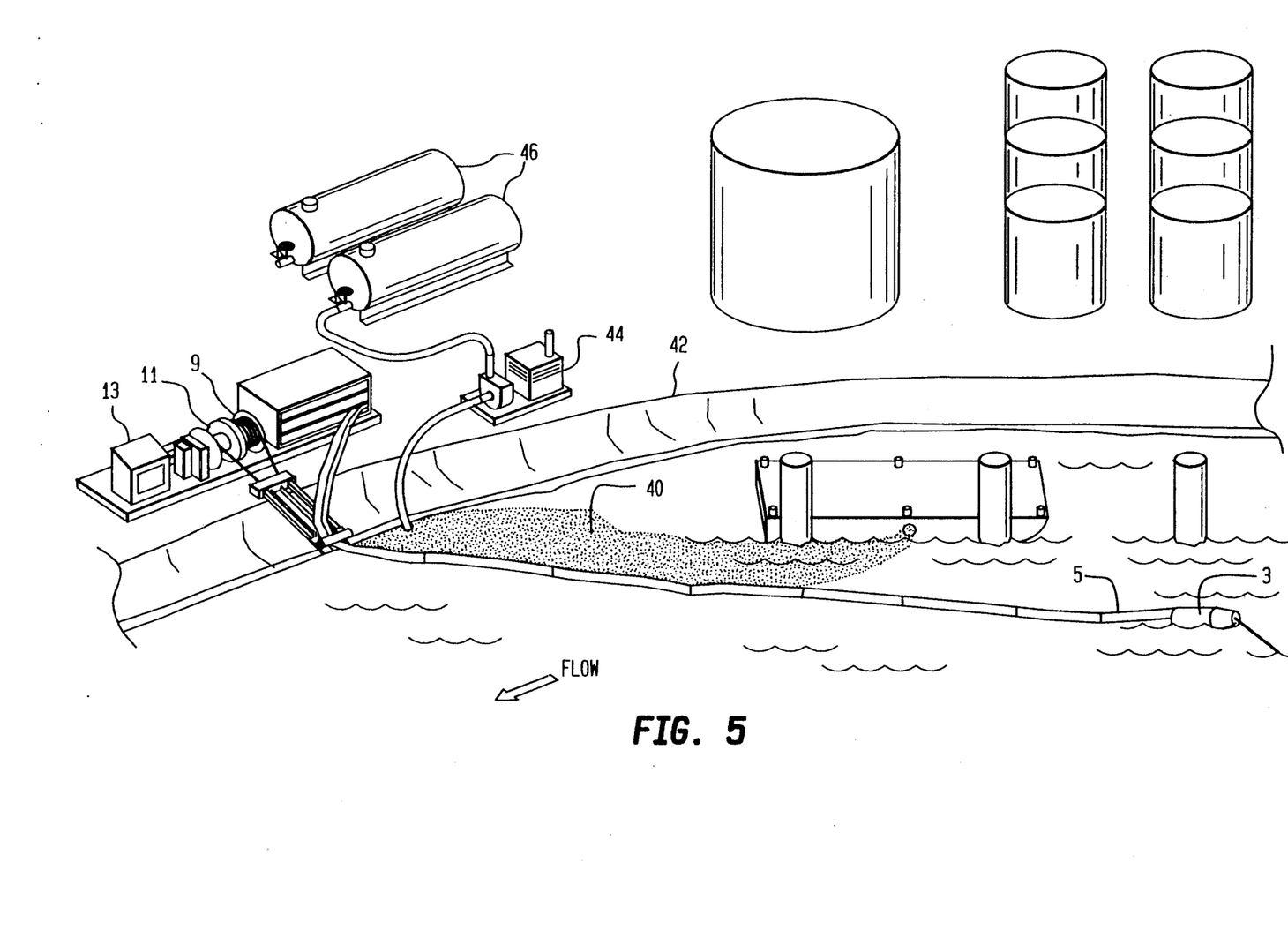
FIG. 5 shows the containment system fully deployed showing the cables.

Referring to FIG. 5 the configuration of the spill containment system with respect to the flow of the river is shown. In this figure the spilled pollutant 40 is trapped between the boom 5 and the shore of the river 42. A pumping system 44 can then pump the pollutants out of the river into temporary holding tanks 46 and store the pollutants until disposal can be effected.

When the system is not deployed, the stainless steel wire rope rests on the bottom of the river bed. The cable and the river bed anchor which rests on the bottom of the river therefore pose no hazard to navigation unlike the components of other systems.

The use of the "clothesline" architecture provides added security in the event that the boom breaks or separates from the steel deployment cable. In such an occurrence, a new boom can merely be attached to the deployment cable via another shackle and the system redeployed within minutes.

Figure 6:
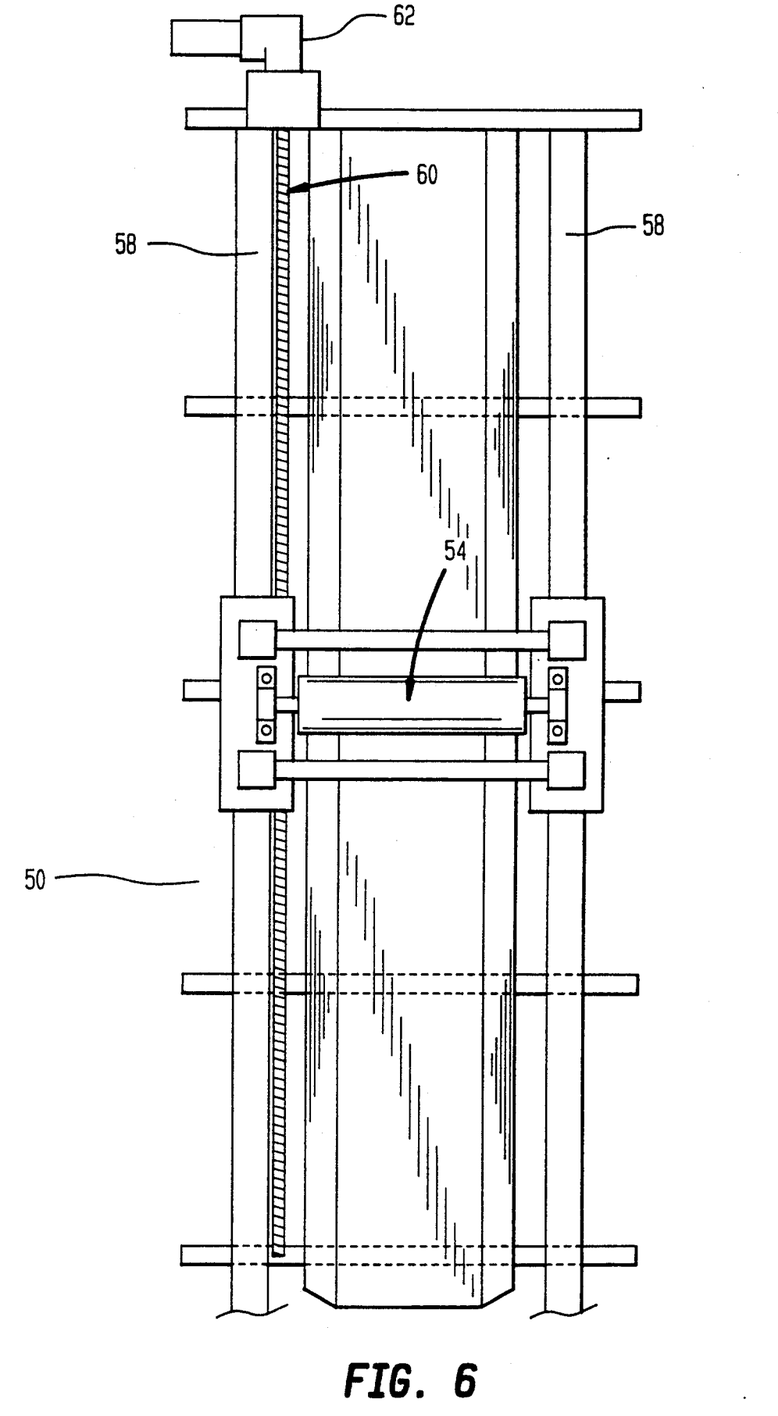
FIG. 6 shows the boom tension device.
Figure 7:
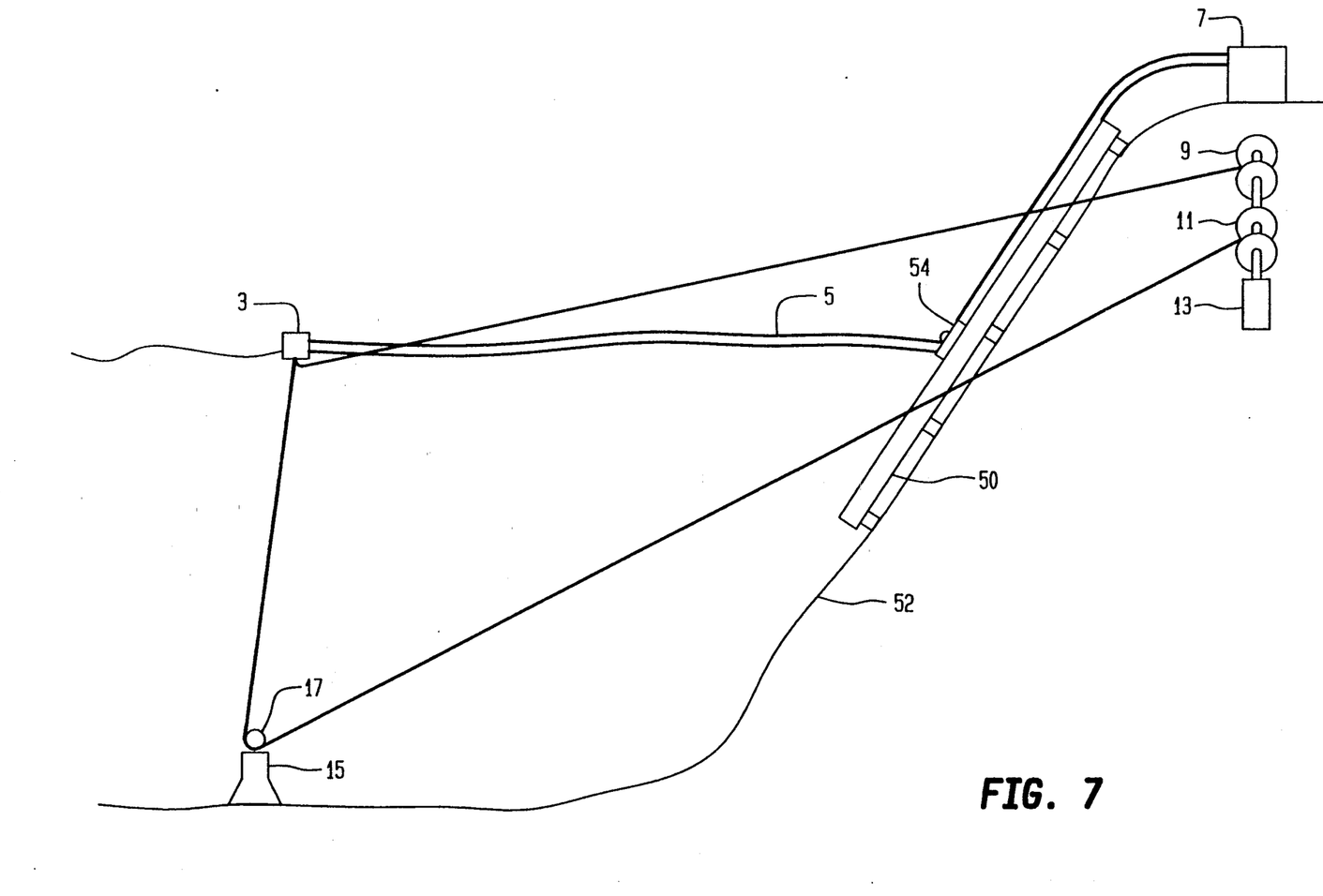
FIG. 7 shows the containment system, fully deployed, utilizing the boom tension device.

FIG. 6 shows the boom tension device 50, which acts as a deployment ramp for the boom 5 and is utilized to insure that tension is maintained on the boom 5 to keep it in contact with the water at the shoreline. As shown in FIG. 7, the boom tension device 50 runs down the river bank 52 and into the water, perpendicular to the river current, at the shoreline where the boom 5 is to be deployed. The boom tension device 50 is fixed to the bank 52 at its bottom end. The boom 5 is fed down the ramp 50 into the water at deployment after passing beneath an idler roller 54. The idler roller 54 is kept at the water level 56 and puts tension on the boom 5 at the shoreline to ensure that the boom 5 doesn't rise out of the water.

As shown in FIG. 6, the idler roller 54 is attached to and slides along I-beam rails 58, driven by a drive screw 60 powered by a drive unit 62. In general, the drive screw 60 may be turned by hand or by any other drive means. Likewise, the drive screw 60 is merely one embodiment of a means for transferring the mechanical work and drive power produced by the drive means to the idler roller 54. Using the drive means and the transfer means to move the idler roller 54 to the water level 56 of the river ensures that the boom 5, which passes beneath the idler roller 54, will not rise above this water level 56. The boom tension device is also equipped with a water level sensor such as a float device (not shown) which automatically lowers the idler roller to the water level during deployment, thereby ensuring any pollutants are trapped by the shore and the boom and do not escape through any gap between the boom and the shore.

SUMMARY

An oil spill or pollutant containment system has been shown which can be deployed very quickly at a spill site and contains a oil spill or other pollutant through use of a floating boom and the river current. While one specific embodiment has been shown other embodiments will be obvious to those skilled in the art without departing from the spirit and scope of the invention disclosed.

What is claimed is:

1. A spill containment system to be used in a moving body of water having a bottom, a water level, and a bank, comprising:
   a) a deployment cable;
   b) a floating boom, having a first end and a second end, attached to the deployment cable at the first end and attached to a storage means at the second end;
   c) an attachment means for attaching the deployment cable to the floating boom;
   d) a supply reel, located on the bank, on which a portion of the deployment cable is stored;
   e) a take up reel, located near the supply reel on the bank, on which a portion of the deployment cable is stored;
   f) a subsurface anchor affixed to the bottom of the moving body of water some distance from the bank;
   g) a guide means affixed to the subsurface anchor, the deployment cable being slidably attached to the guide means;
   h) a first drive motor connected to the supply reel;
   i) a second drive motor connected to the take up reel; and
   j) actuation means to start the first drive motor and the second drive motor;
   k) the first drive motor and the second drive motor functioning so as to cause more of the deployment cable to be stored on the take up reel and less of the deployment cable to be stored on the supply reel, moving the floating boom toward a point on the water level above the subsurface anchor.

2. The spill containment system of claim 1, wherein the deployment cable is constructed from type 304 stainless steel.

3. The spill containment system of claim 1, wherein the actuation means is selected from the group of actuation means consisting of radio controlled switches and mechanical contact switches.

4. The spill containment system of claim 1, wherein the drive motors are hydraulic drive motors.

5. The spill containment system of claim 1, wherein the attachment means is a shackle.

6. The spill containment system of claim 1, further comprising a floatation device attached to the first end of the floating boom for keeping the floating boom at the water level.

7. The spill containment system of claim 6, wherein the floatation device comprises a buoyant material and an attachment rod, the attachment rod affixed to the buoyant material and protruding from the buoyant material so as to be available to be attached to the attachment means.

8. The spill containment system of claim 1, wherein movement of the deployment cable results in movement of the floatation device and the floating boom in the direction of movement of the deployment cable along the water level toward a point above the subsurface anchor.

9. The spill containment system of claim 1, wherein the floating boom comprises a floating spine attached to a skirt.

10. The spill containment system of claim 1, further comprising a boom deployment ramp having a top end and a bottom end, the bottom end fixed to the bank of the moving body of water, the boom deployment ramp comprising:
   a) a plurality of rails running from the top end of the deployment ramp to the bottom end of the deployment ramp;
   b) an idler roller, slidably attached to the rails such that the idler roller can move from the top end of the deployment ramp to the bottom end of the deployment ramp;
   c) a drive means for performing mechanical work; and
   d) a transfer means, in contact with the drive means and the idler roller, for transferring mechanical work from the drive means to the idler roller so as to slide the idler roller along the rails between the top end of the deployment ramp to the bottom end of the deployment ramp;
   e) the floating boom passing under the idler roller so that the floating boom will not rise to a level higher than the idler roller.

11. The spill containment system of claim 10, wherein the bottom end of the boom deployment ramp is located below the water level of the moving body of water and the idler roller is kept at the water level, so that the floating boom maintains contact with the water level at all points along the floating boom between the floatation device and the idler roller.

12. A spill containment system to be used in a moving body of water having a bottom, a water level, and a bank, comprising:
   a) a deployment cable;
   b) a floating boom, having a first end and a second end, attached to the deployment cable at the first end and attached to a storage means at the second end;
   c) an attachment means for attaching the deployment cable to the floating boom;
   d) a supply reel, located on the bank, on which a portion of the deployment cable is stored;
   e) a take up reel, located near the supply reel on the bank, on which a portion of the deployment cable is stored;
   f) a subsurface anchor affixed to the bottom of the moving body of water some distance from the bank;
   g) a guide means affixed to the subsurface anchor, the deployment cable being slidably attached to the guide means;
   h) a first drive motor connected to the supply reel;
   i) a second drive motor connected to the take up reel;
   j) actuation means to start the first drive motor and the second drive motor, causing the deployment cable to move from the supply reel to the take up reel via the guide means; and
   k) floatation device attached to the first end of the floating boom for keeping the floating boom at the water level;
   l) wherein movement of the deployment cable results in movement of the floatation device and the floating boom in the direction of movement of the deployment cable along the water level toward a point above the subsurface anchor.

13. The spill containment system of claim 12, wherein the deployment cable is constructed from type 304 stainless steel.

14. The spill containment system of claim 12, wherein the actuation means is selected from the group of actuation means consisting of radio controlled switches and mechanical contact switches.

15. The spill containment system of claim 12, wherein the drive motors are hydraulic drive motors.

16. The spill containment system of claim 12, wherein the attachment means is a shackle.

17. The spill containment system of claim 12, wherein the floatation device comprises a buoyant material and an attachment rod, the attachment rod affixed to the buoyant material and protruding from the buoyant material so as to be available to be attached to the attachment means.

18. The spill containment system of claim 12, wherein the floating boom comprises a floating spine attached to a skirt.

19. The spill containment system of claim 12, wherein the guide means is a pulley.

20. The spill containment system of claim 12, further comprising a boom deployment ramp having a top end and a bottom end, the bottom end fixed to the bank of the moving body of water, the boom deployment ramp comprising:

a) a plurality of rails running from the top end of the deployment ramp to the bottom end of the deployment ramp;
b) an idler roller, slidably attached to the rails such that the idler roller can move from the top end of the deployment ramp to the bottom end of the deployment ramp;
c) a drive means for performing mechanical work; and
d) a transfer means, in contact with the drive means and the idler roller, for transferring mechanical work from the drive means to the idler roller so as to slide the idler roller along the rails between the top end of the deployment ramp to the bottom end of the deployment ramp;
e) the floating boom passing under the idler roller so that the floating boom will not rise to a level higher than the idler roller.

21. The spill containment system of claim 20, wherein the bottom end of the boom deployment ramp is located below the water level of the moving body of water and the idler roller is kept at the water level, so that the floating boom maintains contact with the water level at all points along the floating boom between the floatation device and the idler roller.

* * * * *